(12) United States Patent
Gerhardt et al.

(10) Patent No.: US 12,088,101 B2
(45) Date of Patent: Sep. 10, 2024

(54) CIRCUIT ARRANGEMENT FOR CONTROLLING A PLURALITY OF ELECTRICAL LOADS

(71) Applicant: BSH Hausgeraete GmbH, Munich (DE)

(72) Inventors: Martin Gerhardt, Regensburg (DE); Martin Pflauminger, Pfatter (DE)

(73) Assignee: BSH Hausgeraete GmbH, Munich (DE)

( * ) Notice: Subject to any disclaimer, the term of this patent is extended or adjusted under 35 U.S.C. 154(b) by 412 days.

(21) Appl. No.: 17/577,790

(22) Filed: Jan. 18, 2022

(65) Prior Publication Data

US 2022/0231505 A1   Jul. 21, 2022

(30) Foreign Application Priority Data

Jan. 21, 2021 (DE) .................... 10 2021 200 507.1

(51) Int. Cl.
 *H02J 3/14*   (2006.01)
 *H05B 45/30*  (2020.01)

(52) U.S. Cl.
 CPC ............... *H02J 3/14* (2013.01); *H05B 45/30* (2020.01); *H02J 2310/14* (2020.01)

(58) Field of Classification Search
 None
 See application file for complete search history.

(56) References Cited

U.S. PATENT DOCUMENTS

| 2015/0070340 A1* | 3/2015 | Trachtenberg | H04N 5/64 345/211 |
| 2021/0002170 A1* | 1/2021 | Chien | H05B 45/30 |
| 2021/0166619 A1* | 6/2021 | Kim | H05B 47/155 |

OTHER PUBLICATIONS

Anonymous: "Shifting out to multiple WS2801s using optocouplers—Electronics Forums", Apr. 23, 2015 (Apr. 23, 2015), pp. 1-11, XP055927302, found on the Internet: URL:https://web.archive.org/web/20150423034508/https:// forum.allaboutcircuits.com/threads/shifting-out-to-multiple-ws2801s-using-optocouplers.74760/ [retrieved Jun. 1, 2022].

(Continued)

*Primary Examiner* — Jared Fureman
*Assistant Examiner* — Joel Barnett
(74) *Attorney, Agent, or Firm* — Laurence A. Greenberg; Werner H. Stemer; Ralph E. Locher

(57) ABSTRACT

A circuit arrangement for controlling a plurality of loads of an electrical appliance has a main control module, arranged in a first voltage range and configured to generate control data for controlling a plurality of loads, which are arranged in a second voltage range. A galvanic isolation unit transfers the control data via a galvanically isolated connection from the first voltage range to the second voltage range. At least one auxiliary control module has a plurality of control outputs for the loads and an LED driver for operating a corresponding plurality of LED arrangements via the of control outputs, and/or a general-purpose input/output expansion circuit with programmable control outputs. Based on the control data, the auxiliary control module identifies a first control output for controlling the first load and causes the first load to be controlled via the first control output.

18 Claims, 1 Drawing Sheet

(56) References Cited

OTHER PUBLICATIONS

Anonymous: "RGB LED Chain—20 LED Addressable—COM-11020—SparkFun Electronics", Mar. 30, 2015 (Mar. 30, 2015), pp. 1-3, XP055927101, found on the Internet: URL:https://web.archive.org/web/20150330024126/https://www.sparkfun.com/products/11020 [retrieved Jun. 1, 2022].

Anonymous: "Addressable WS2801 LED Strip", Sep. 24, 2014 (Sep. 24, 2014), pp. 1-4, XP055927105, found on the Internet: URL:https://web.archive.org/web/20140924190952if_/http://dlnmh9ip6v2uc.cloudfront.net/datasheets/Components/LED/WS2801%20LED%20pixel.pdf [retrieved Jun. 1, 2022].

"Preliminary WS2801 3-Channel Constant Current LED Driver With Programmable PWM Outputs", Apr. 11, 2014 (Apr. 11, 2014), XP055200755, found on the Internet: URL:http://web.archive.org/web/20140411063740/http://www.espruino.com/datasheets/WS2801.pdf [retrieved Jul. 7, 2015].

\* cited by examiner

CIRCUIT ARRANGEMENT FOR CONTROLLING A PLURALITY OF ELECTRICAL LOADS

CROSS-REFERENCE TO RELATED APPLICATION

This application claims the priority, under 35 U.S.C. § 119, of German Patent Application DE 10 2021 200 507.1, filed Jan. 21, 2021; the prior application is herewith incorporated by reference in its entirety.

FIELD AND BACKGROUND OF THE INVENTION

The invention relates to a circuit arrangement for controlling a plurality of electrical loads, such as for example power switching elements.

A household appliance, such as for example a washing machine or a dishwasher, typically has different electrical loads, such as for example electric motors, valves, pumps, switching elements, etc., which are arranged for example in the FELV range (functional extra-low voltage) of the household appliance. On the other hand, the different electrical loads are typically controlled by means of one or several microcontrollers which are arranged in the SELV range (safety extra-low voltage) or in the PELV range (protective extra-low voltage).

SUMMARY OF THE INVENTION

The galvanic isolation between a control module, in particular a microcontroller, in the PELV/SELV range and several different electrical loads in the FELV range is typically associated with a relatively high outlay. The present document is concerned with the technical object of enabling electrical loads in an electrical appliance to be controlled efficiently (in terms of cost, weight and/or installation space) and in a galvanically isolated manner.

With the above and other objects in view there is provided, in accordance with the invention, a circuit arrangement for controlling a plurality of loads of an electrical appliance, the circuit arrangement comprising:
  a main control module arranged in a first voltage range of the circuit arrangement and configured to generate control data for controlling a first load of the plurality of loads; wherein the plurality of loads are arranged in a second voltage range;
  a galvanic isolation unit configured to transfer the control data via a galvanically isolated connection from the first voltage range to the second voltage range;
  at least one auxiliary control module configured to receive the control data and having a plurality of control outputs for the plurality of loads;
  said at least one auxiliary control module comprising:
    a light-emitting diode driver configured to operate a corresponding plurality of LED arrangements via said plurality of control outputs; and/or
    a general-purpose input/output expansion circuit having a plurality of programmable control outputs; and
  said at least one auxiliary control module being configured, based on the control data:
    to identify a first control output from the plurality of control outputs for controlling a first load of the plurality of loads; and
    to cause the first load of the plurality of loads to be controlled via the first control output.

In other words, according to one aspect of the invention, a circuit arrangement (also referred to as circuit apparatus) for controlling a plurality of loads of an electrical appliance, in particular a household appliance, is described. Exemplary household appliances are a washing machine, a dishwasher, a dryer, a fridge, a cooker, an oven, etc. An electrical load of an electrical appliance can be configured to provide a function of the electrical appliance, for example a heating function, a cooling function, a drive function, etc. Exemplary electrical loads are: an electrically driven valve, an electrically driven motor, an electrically driven heater, an electrically driven pump and/or an electrical switching element, in particular a relay, a TRIAC, a transistor, a MOSFET. An electrical switching element can be used in particular to switch (i.e., to activate or deactivate) another load, for example a valve, a motor, a heater, a pump, etc.

The circuit arrangement comprises a main control module (e.g. a microcontroller), which is arranged in a first voltage range of the circuit arrangement, and which is configured to generate control data for controlling a first load of the plurality of loads. The control data can comprise a control instruction for a specific load of the electrical appliance, for example in order to activate or deactivate the load or in order to set and/or change the power consumption or the power output of the load. The first voltage range can be a safety extra-low voltage (SELV) or a protective extra-low voltage (PELV) range.

The plurality of loads can be arranged in a second voltage range which differs from the first voltage range. Here, the second voltage range may belong to a different protection class than the first voltage range. In particular, the second voltage range can be a functional extra-low voltage (FELV) range.

Furthermore, the circuit arrangement comprises a galvanic isolation unit, which is configured to transfer the control data via a galvanically isolated connection from the first voltage range to the second voltage range. The galvanic isolation unit can comprise for example an optocoupler, a capacitive coupler and/or an inductive coupler.

The circuit arrangement further comprises at least one auxiliary control module, which comprises a plurality of control outputs for the corresponding plurality of loads. The at least one auxiliary control module can be configured to control the plurality of control outputs independently of one another, in particular to switch them independently of one another.

The auxiliary control module can have a data input via which the control data from the galvanic isolation unit can be received. The received control data can then be used to operate one or several of the control outputs. In particular, the current and/or the voltage can be set at at least one control output as a function of the control data.

The auxiliary control module can comprise a light-emitting diode (LED) driver or the auxiliary control module can be embodied as an LED driver. The LED driver can be embodied to operate a corresponding plurality of LED arrangements (e.g. LEDs or LED chains) via the plurality of control outputs. In particular, the plurality of control outputs can be provided for controlling LED arrangements with different colors, in particular a red (R), a green (G) and/or a blue (B) LED arrangement.

Alternatively or in addition, the auxiliary control module can comprise a general-purpose input/output (GPIO) expansion circuit or expander, or can be embodied as a GPIO expansion circuit or expander. The GPIO circuit or expander can be embodied such that the behavior of the plurality of control outputs can be programmed (by a user, possibly freely).

In this way, one or several cost-efficient auxiliary control modules can be used in the second voltage range, in particular in a manner departing from their original purpose, in order to control the individual electrical (power) loads. Here, the one or several auxiliary control modules can be configured in each case to identify, on the basis of the control data, a first control output from the plurality of control outputs for controlling the first load. The control data can have for example an identifier (such as a bit code) for the first load or for the first control output. The auxiliary control module can be embodied to assign the control data, in particular a control instruction contained in the control data, to the first control output on the basis of the identifier.

Furthermore, the one or several auxiliary control modules can be configured to cause the first load to be controlled via the first control output. The control data can comprise a control instruction for the first load (in addition to the identifier of the first load). The auxiliary control module can be configured to operate the first control output as a function of the control instruction. In particular, the voltage level and/or the current can be set to or at the first control output as a function of the control instruction.

A circuit arrangement is thus described which uses one or several auxiliary control modules (in particular one or several LED driver chips and/or one or several GPIO expander chips) in the second voltage range in order to control different loads of an electrical appliance. This can enable several different loads in the second voltage range to be controlled in an efficient manner using a single galvanic isolation unit. Furthermore, LED driver chips and/or GPIO expander chips are used in large quantities for other purposes (in particular for controlling LED-based light elements), and can thus be provided in a cost-efficient manner for controlling the electrical loads of an electrical appliance (in a manner departing from their original purpose).

The auxiliary control module can be embodied to set the voltage level of the first control output to high or low as a function of the control data, in particular as a function of the control instruction for the first load. In this way, the first load can be controlled, in particular activated or deactivated, or opened or closed, in a reliable manner. When the auxiliary control module, in particular the LED driver, is used in accordance with its original purpose, the voltage level at the first control output can be used to activate or deactivate an LED arrangement connected to the first control output.

Alternatively or in addition, the auxiliary control module, in particular the LED driver of the auxiliary control module or the auxiliary control module implemented by way of an LED driver, can be embodied to set the (first) current at the first control output by means of pulse-width modulation (PWM) as a function of the control data, in particular as a function of the control instruction for the first load, in particular in order to set the power, for example the mechanical power, the heating power, etc. of the first load.

The LED driver can be configured to dim an LED arrangement connected to a control output of the LED driver by means of PWM. Here, the pulse width can be reduced or increased in order to reduce or increase the strength of the current at the control output in a corresponding manner. This dimmer mechanism of the LED driver can be used in the circuit arrangement for controlling an electrical load of the electrical appliance. In this way, a particularly efficient and precise control of different electrical loads in an electrical appliance can be enabled.

The circuit arrangement can comprise a first auxiliary control module and a second auxiliary control module which are arranged, for instance in a cascaded connection, within the second voltage range. Here, the auxiliary control modules can be of identical design. The auxiliary control modules can in each case have a data input (in particular a data input pin) via which the control data can be received by the respective auxiliary control module. Furthermore, the auxiliary control modules can in each case have a data output, in particular a cascading pin, via which the control data can be forwarded to a downstream auxiliary control module. The auxiliary control modules can thus be embodied for a cascading, in which the data input of a downstream auxiliary control module is connected to the data output of an upstream auxiliary control module. The control data can thus be forwarded in a cascaded manner from one auxiliary control module to an auxiliary control module disposed directly downstream. In this way, the number of electrical loads which can be controlled in the second voltage range via the main control module (which is arranged in the first voltage range) can be adjusted, in particular increased, in an efficient and flexible manner.

When a first and a second auxiliary control module are used, the first auxiliary control module can comprise a plurality of first control outputs for a corresponding plurality of first loads. The second auxiliary control module can comprise a plurality of second control outputs for a corresponding plurality of second loads. For example, each auxiliary control module can be configured to control two or more, or three or more, or four or more electrical loads of the electrical appliance. Here, the individual control outputs can be constructed identically in each case.

The first auxiliary control module can be embodied to forward the control data received via the galvanic isolation unit, in particular via the cascading pin of the first auxiliary control module, to the second auxiliary control module. In particular, the first auxiliary control module can be embodied as a shift register, which forwards the control data to the second auxiliary control module as a function of a cycle time.

The main control module can be embodied to transmit the control data to the auxiliary control module by means of a line code, in particular by means of a binary line code, for example a non-return-to-zero (NRZ) code. In this way, a particularly efficient control of several different loads can be enabled.

According to a further aspect, a household appliance (e.g. a washing machine, a dishwasher, an oven, a cooker, a kitchen appliance, a vacuum cleaner, a dryer, a fridge, etc.) is described which comprises the circuit arrangement described in this document. The household appliance can comprise a mains connection for connecting the household appliance to an AC supply voltage. Furthermore, the household appliance can comprise a switched mode power supply and/or one or several voltage transformers, which are embodied to provide several different voltage ranges in the household appliance on the basis of the AC supply voltage (e.g. for operating a main control module on the one hand and for operating several different electrical loads on the other hand).

Other features which are considered as characteristic for the invention are set forth in the appended claims.

It should be noted that any aspects of the circuit arrangement described in this document can be combined with one another in a wide variety of ways. In particular, the features of the claims can be combined with one another in a wide variety of ways. In other words, although the invention is illustrated and described herein as embodied in circuit arrangement for controlling a plurality of electrical loads, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
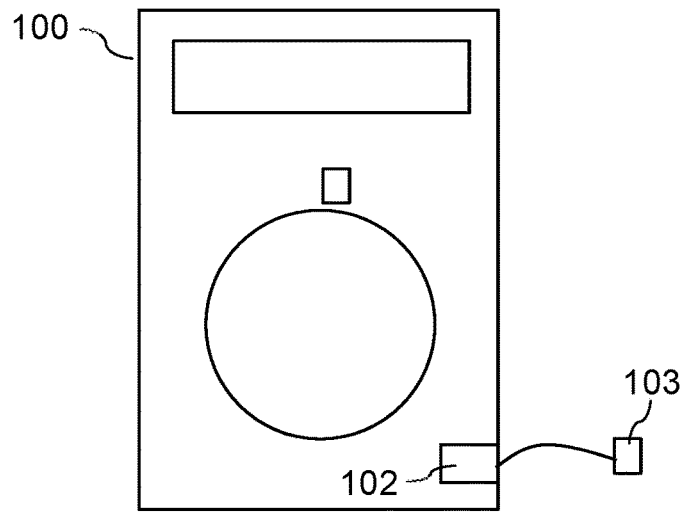
FIG. 1A shows a block diagram of an exemplary household appliance.

As noted above, the present invention concerns itself with the efficient, galvanically isolated control of different loads, in particular of different switching elements, of an appliance, in particular a household appliance. In this context, FIG. 1A shows an exemplary household appliance 100, for example a washing machine, with a mains connection 102, in particular with a switched mode power supply, via which the household appliance 100 can be connected to an AC supply voltage 103.

Figure 1B:
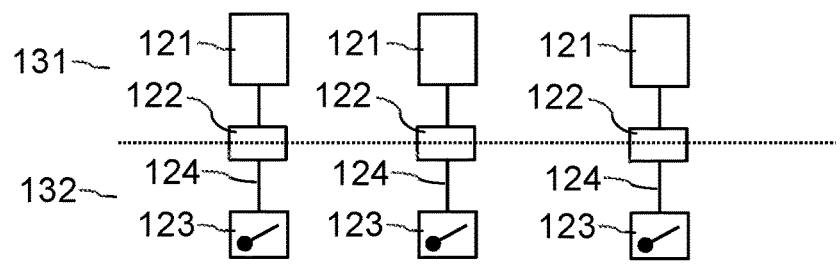
FIG. 1B shows an exemplary galvanic isolation between control modules and loads of a household appliance.

As shown by way of example in FIG. 1B, the household appliance 100 typically comprises one or several control modules 121, which are configured to control different electrical loads 123, in particular different electrical switching elements, of the household appliance 100. In particular, a control instruction 124 can be transmitted from a control module 121 to an electrical load 123, for example in order to activate the electrical load 123 or to deactivate the electrical load 123.

The control module 121 for an electrical load 123 can be arranged in the SELV/PELV (safety/protective extra low voltage) range 131 of the household appliance 100, while the electrical load 123 is arranged in the FELV (functional extra low voltage) range 132 of the household appliance 100. The expression that a given element is "arranged in" a given range, or voltage range, is partly meant to be understood as an indication of its location and partly meant to be understood as an indication of its supply voltage or operating voltage. The term "galvanic isolation" is informed by the different (voltage) ranges and, accordingly, a separation in terms of location and/or an insulation in terms of protecting against the transmission or bleed of the respective voltages between the ranges. A galvanic isolation unit 122 is therefore arranged between the control module 121 and the electrical load 123 and is configured to transfer the control instruction 124 via a galvanically isolated communication connection from the control module 121 to the electrical load 123.

A household appliance 100 can thus comprise different electrical loads 123, such as for example several valves, one or several motors, a heater, one or several pumps, etc., which can be switched as necessary via a corresponding one or several relays, TRIACs, transistors, MOSFETs, etc. The one or several switching elements 123 are actuated by one or several control modules 121, in particular microcontrollers.

The actuation of the switching elements 123 takes place typically in a galvanically isolated manner for safety reasons and/or as a protective measure and/or to avoid ground loops and/or to avoid shifts in potential. The galvanic isolation of the actuation of a power switching element 123 takes place for example optically (by means of an optocoupler, optotriac, etc.), inductively (by means of a transformer), or capacitively (by means of a capacitive coupler, a capacitor, etc.). In this way, the individual switching elements 123 can be switched via a microcontroller that is supplied by SELV or PELV.

The galvanic isolation between a control module 121 and the different loads 123 can be effected through the use of a dedicated galvanic isolation unit 124 for each individual load 123. Alternatively, an additional control module (in particular an additional microcontroller) can be used, which communicates with the main control module 121 via a separate data bus. The galvanically isolated actuation of the individual loads 123 can be effected by the additional control module.

The above-cited measures for galvanic isolation are typically associated with relatively high costs, in particular for installing a dedicated isolation unit 124 for each individual load 123, or for installing an additional microcontroller. Furthermore, a relatively large isolation trench is typically required between the SELV/PELV range 131 and the FELV range 132.

Figure 2:
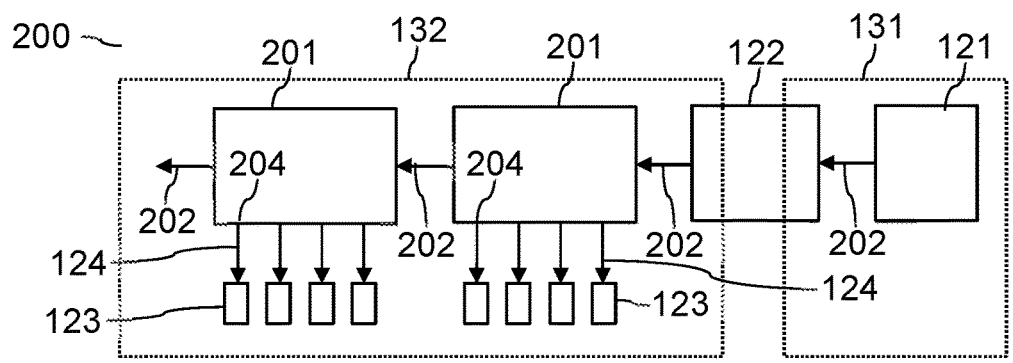
FIG. 2 shows an exemplary circuit arrangement for controlling several electrical loads of an electrical appliance, in particular a household appliance.

FIG. 2 shows a circuit arrangement 200 with a main control module 121, which is arranged in a first voltage range 131 (in particular in a SELV range or in a PELV range). The main control module 121 is connected to one or several auxiliary control modules 201 via a galvanic isolation unit 122. Here, an auxiliary control module 201 is configured to control one or several loads 123. In particular, an auxiliary control module 201 can have one or several control outputs 204 for controlling a corresponding one or several loads 123. The one or several auxiliary control modules 201 of the circuit arrangement 200 are arranged in a second voltage range 132 (in particular in an FELV range).

The main control module 121 is configured to transmit control data 202 to one of the auxiliary control modules 201 via the isolation unit 122. Here, the control data 202 can indicate an identifier for the load 123, in particular for the auxiliary control module 201 and for the control output 204, to which the load 123 is connected, for which the control data 202 is intended. Furthermore, the control data 202 can have a control instruction 124 for the load 123 indicated by the identifier (e.g., a control instruction 124 for activating or deactivating the load 123 or a control instruction 124 for setting the power of the load 123).

An auxiliary control module 201 of the circuit arrangement 200 can be configured to check control data 202, which has been transmitted by the main control module 121, in order to determine whether the control data 202 is intended for a load 123 which is connected to a control output 204 of the auxiliary control module 121. If this is not the case, the control data 202 can be ignored by the auxiliary control module 121. If this is the case, the control instruction 124 can be forwarded to the identified control output 204 of the auxiliary control module 121. This can enable different loads 123 to be controlled in an efficient manner across different voltage ranges 131, 132.

In a preferred example, an auxiliary control module 121 is or comprises an LED (light-emitting diode) driver, in particular a single-line LED driver, or a GPIO (general-purpose input/output) expander. In this way, a particularly efficient circuit arrangement 200 can be provided. The GPIO has a plurality of programmable outputs (204); that is, the behavior of the plurality of control outputs (204) can be programmed.

The use of single-line LED drivers or GPIO expanders 201 enables not only LEDs but also other loads 123 to be actuated. Here, just a single galvanic isolation element 122 is required. Furthermore, a control output 204, in particular a chip pin, can be used in each case for the individual loads 123. The use of LED drivers or GPIO expanders 201 in the FELV range 132 makes it possible to reduce the PCB (printed circuit board) area or footprint of the circuit arrangement 200, as the number of isolation elements 122 between SELV/PELV 131 and FELV 132 can be reduced. The main microcontroller 121 can transmit a line code 202, for example a non-return-to-zero code, as an actuation signal 123 via the galvanic isolation element 122 to a driver 201. The driver 201 can then switch a load 123 directly or via a power switch.

A driver 201 can be configured to switch several outputs 204 independently of one another. It is also possible to cascade several drivers 201. Here, a cascade of drivers 201 can work in the manner of a shift register, in which the cycle time is generated by the drivers 201 themselves and/or transmitted separately. As a result, an almost unlimited multiplicity of drivers 201 can be linked to one another and can in turn actuate a corresponding number of loads 123.

The use of LED drivers 201 for actuating loads 123 in an electrical appliance 100 enables the loads 123 to be actuated in a particularly efficient manner in terms of costs and installation space, in particular on account of the fact that fewer galvanic isolation elements 122 can be used and/or on account of the fact that LED drivers 201 are manufactured in high quantities. Furthermore, the cascading of drivers 201 enables the number of controlled loads 123 to be adjusted flexibly. Moreover, the required PCB (printed circuit board) area for the isolation trench between the voltage ranges 131, 132 can be reduced.

Once more in a summary of the disclosure, there is provided a circuit arrangement (200) for controlling a plurality of loads (123) of an electrical appliance (100). The circuit arrangement (200) comprises a main control module (121), which is arranged in a first voltage range (131) of the circuit arrangement (200), and which is configured to generate control data (202) for controlling a first load (123) from the plurality of loads (123); wherein the plurality of loads (123) is arranged in a second voltage range (132). The circuit arrangement (200) further comprises a galvanic isolation unit (122), which is configured to transfer the control data (202) via a galvanically isolated connection from the first voltage range (131) to the second voltage range (132). In addition, the circuit arrangement (200) comprises at least one auxiliary control module (201), which comprises a plurality of control outputs (204) for the corresponding plurality of loads (123). The auxiliary control module (201) comprises a light-emitting diode (LED for short) driver, which is embodied to operate a corresponding plurality of LED arrangements via the plurality of control outputs (204), and/or a general-purpose input/output (GPIO for short) expansion circuit, in which a behavior of the plurality of control outputs (204) can be programmed. The auxiliary control module (201) is configured, on the basis of the control data (202), to identify a first control output (204) from the plurality of control outputs (204) for controlling the first load (123); and to cause the first load (123) to be controlled via the first control output (204).

It will be understood that the present invention is not restricted to the exemplary embodiments described. It should be noted that the description and the figures are only intended to illustrate the principle of the proposed circuit arrangement.

The invention claimed is:

1. A circuit arrangement for controlling a plurality of loads of an electrical appliance, the circuit arrangement comprising:
    a main control module arranged in a first voltage range of the circuit arrangement and configured to generate control data for controlling a first load of the plurality of loads; wherein the plurality of loads are arranged in a second voltage range;
    a galvanic isolation unit configured to transfer the control data via a galvanically isolated connection from the first voltage range to the second voltage range;
    at least one auxiliary control module configured to receive the control data and having a plurality of control outputs for the plurality of loads;
    said at least one auxiliary control module comprising:
        a light-emitting diode driver configured to operate a corresponding plurality of LED arrangements via said plurality of control outputs; and/or
        a general-purpose input/output expansion circuit having a plurality of programmable control outputs; and
    said at least one auxiliary control module being configured, on a basis of the control data:
        to identify a first control output from the plurality of control outputs for controlling a first load of the plurality of loads; and
        to cause the first load of the plurality of loads to be controlled via the first control output.

2. The circuit arrangement according to claim 1, wherein said at least one auxiliary control module is configured to set a voltage level of the first control output to high or low as a function of the control data in order to control the first load.

3. The circuit arrangement according to claim 2, wherein said at least one auxiliary control module is configured to selectively activate or deactivate the first load.

4. The circuit arrangement according to claim 1, wherein:
    said at least one auxiliary control module comprises an LED driver; and
    said LED driver is configured to set a first current at the first control output by way of pulse-width modulation as a function of the control data.

5. The circuit arrangement according to claim 1, wherein said LED driver is configured to set a power of the first load.

6. The circuit arrangement according to claim 1, wherein:
    said at least one auxiliary control module comprises an LED driver; and
    said plurality of control outputs are provided for controlling LED arrangements with different colors.

7. The circuit arrangement according to claim 1, wherein said plurality of control outputs are provided for controlling a red LED arrangement, a green LED arrangement, and/or a blue LED arrangement.

8. The circuit arrangement according to claim 1, wherein:
    said at least one auxiliary control module is one of a plurality of auxiliary control modules including a first auxiliary control module and a second auxiliary control module which are arranged within the second voltage range;
    said first auxiliary control module comprises a plurality of first control outputs for a corresponding plurality of first loads;

said second auxiliary control module comprises a plurality of second control outputs for a corresponding plurality of second loads; and said first auxiliary control module is configured to forward the control data received from said galvanic isolation unit to said second auxiliary control module.

9. The circuit arrangement according to claim 8, wherein said plurality of auxiliary control modules are cascaded within the second voltage range and said first auxiliary control module is configured to forward the control data to said to the second auxiliary control module via a cascading pin.

10. The circuit arrangement according to claim 8, wherein said first auxiliary control module is a shift register configured to forward the control data to said second auxiliary control module as a function of a cycle time.

11. The circuit arrangement according to claim 1, wherein said main control module is configured to transmit the control data to said at least one auxiliary control module by way of a line code.

12. The circuit arrangement according to claim 11, wherein said main control module is configured to transmit the control data to said at least one auxiliary control module by a binary line code.

13. The circuit arrangement according to claim 11, wherein said main control module is configured to transmit the control data to said at least one auxiliary control module by a non-return-to-zero code.

14. The circuit arrangement according to claim 1, wherein said at least one auxiliary control module is configured to control said plurality of control outputs independently of one another.

15. The circuit arrangement according to claim 1, wherein said at least one auxiliary control module is configured to switch said plurality of control outputs independently of one another.

16. The circuit arrangement according to claim 1, wherein the plurality of loads are at least one type of load selected from the group consisting of an electrically driven valve, an electrically driven motor, an electrically driven heater, an electrically driven pump, and an electrical switching element.

17. The circuit arrangement according to claim 1, wherein the plurality of loads are switching elements selected from the group consisting of a relay, a TRIAC, a transistor, and a MOSFET.

18. The circuit arrangement according to claim 1, wherein:

the first voltage range is a safety extra-low voltage range or a protective extra-low voltage range; and/or the second voltage range is a functional extra-low voltage range.

* * * * *